United States Patent [19]
Wolf et al.

[11] 3,973,078
[45] Aug. 3, 1976

[54] SEISMIC MOTION-DAMPER FOR UPSTANDING ELECTRICAL EQUIPMENT

[75] Inventors: Charles B. Wolf, Irwin; Donald G. Blazer, Pittsburgh, both of Pa.

[73] Assignee: Westinghouse Electric Corporation, Pittsburgh, Pa.

[22] Filed: Dec. 30, 1974

[21] Appl. No.: 537,515

[52] U.S. Cl. .................................. 174/42; 52/167; 188/318; 200/301; 248/20
[51] Int. Cl.² ..................... F16F 15/00; H02B 5/00; E02D 27/34; F16F 9/19
[58] Field of Search ............ 174/30, 42, 150, 161 R; 200/294, 295, 301; 52/167, 573; 248/15, 18, 20, 358 R

[56] References Cited
UNITED STATES PATENTS

| | | | |
|---|---|---|---|
| 1,770,130 | 7/1930 | Dunmire | 174/30 |
| 2,148,937 | 2/1939 | Gerb | 248/20 X |
| 2,407,014 | 9/1946 | Jones | 248/20 |
| 3,208,700 | 9/1965 | Bloomingdale | 248/20 |
| 3,256,660 | 6/1966 | McMakin | 248/20 X |
| 3,789,174 | 1/1974 | Barkan et al. | 200/294 |
| 3,794,277 | 2/1974 | Smedley et al. | 248/20 |
| 3,856,242 | 12/1974 | Cook | 248/20 |

FOREIGN PATENTS OR APPLICATIONS

| | | | |
|---|---|---|---|
| 1,185,228 | 2/1959 | France | 248/20 |
| 953,575 | 3/1964 | United Kingdom | 174/30 |
| 1,100,123 | 1/1968 | United Kingdom | 248/20 |

OTHER PUBLICATIONS
Cuk et al., "High-Voltage Switchgear for Earthquake-Prone Areas", *Brown Boveri Review, vol. 157, Dec. 1970, pp. 548–553.*

*Primary Examiner*—Laramie E. Askin
*Attorney, Agent, or Firm*—W. R. Crout

[57] ABSTRACT

A seismic damper device is provided between the supporting plate adjacent the bottom of an upstanding piece of electrical apparatus and the lower main frame support members, supporting said upstanding electrical equipment, so that any relative motion between the upstanding column structure and the main lower-disposed frame support structure is restricted. Preferably, a liquid-filled dash-pot assembly, or energy-absorbing device, is utilized at one or more locations extending between the lower supporting plate member of each upstanding column structure and the lower-disposed main supporting framework.

In one form of the invention there are provided three equally-spaced radially-extending support arms extending outwardly from the main supporting plate disposed adjacent and fixed to the lower end of each upstanding column structure. A hydraulic damper assembly is provided for each support arm and has its upper end secured to the outer end of the particular support arm, and the other end of the said damper assembly is attached to the main lower disposed supporting framework structure of the electrical equipment. Any relative motion between the radially-outwardly-extending support arms and the lower-disposed main supporting framework structure causes a hydraulic piston to move within a damper cylinder; provided in each of the three damper assemblies and damping is effected by the displacement of hydraulic liquid, for example, from one side of a piston member in each of the three damper assemblies to the other side thereof through small orifices provided in each damper assembly, for example.

5 Claims, 19 Drawing Figures

SEISMIC MOTION-DAMPER FOR UPSTANDING ELECTRICAL EQUIPMENT

CROSS-REFERENCES TO RELATED APPLICATIONS

Reference may be had to U.S. patent application filed Apr. 26, 1974, Ser. No. 464,729, issued Oct. 7, 1975 as U.S. Pat. No. 3,911,199 to Edward G. Fischer, entitled "Seismic Motion-Damper for Upstanding Electrical Equipment", and assigned to the assignee of the instant patent application.

Also, reference may be made to a co-pending patent application filed Dec. 18, 1973, Ser. No. 425,757, by George B. Cushing et al. entitled "Earthquake-Resistant Reinforced Insulating Composite Columns for Extra-High-Voltage Circuit-Breakers Utilizing Glass-Filament Reinforced Resinous Materials," and likewise assigned to the assignee of the instant patent application.

BACKGROUND OF THE INVENTION

This invention relates to a seismic-resistant support system for upstanding electrical apparatus having a tall slender profile, and, more specifically, relates to a seismic support system of this type that is capable of protecting the upstanding electrical apparatus against severe earthquake forces.

Of interest with respect to this patent application is the following prior art: U.S. Pat. No. 2,711,297 — Thiele; U.S. Pat. No. 3,592,422 — Paine; and the Shock and Vibration Handbook by Harris and Crede, published by McGraw-Hill Book Co. in 1961, especially Volume 2, pages 32-7 through 32-10.

Some types of electrical apparatus, such as live-tank circuit breakers, are characterized by a tall slender profile. Prior designs of such apparatus have not been as resistant to damage from earthquake forces as might be desired.

Of interest, further, with respect to the instant problem is an additional U.S. patent, namely U.S. Pat. No. 3,789,174, issued Jan. 29, 1974 to Philip Barkan et al.

The present invention is particularly applicable to upstanding electrical equipment, which is disposed in some areas of the country where seismic vibrations may occur, for instance in California, where relatively recently, that is, Feb. 9, 1971, severe damage was caused by the San Fernando earthquake in California upon building structures and other upstanding equipment including circuit-breakers. As well known by those skilled in the art, at the higher voltages, say 500 kv, 750 kv and 1,000 kv, the installation requirements demand that the upstanding insulating supports be disposed at considerable distances physically above ground level. Since these supports are insulating, in many instances they are formed of porcelain, or other relatively fragile insulating material, which is subject to fracture upon excessive vibration. Moreover, in the case of "live-tank" circuit-breakers, the actual heavy interrupting unit, or head, is disposed at a considerably elevated distance above ground potential, and, again, is subject to seismic vibrations. Accordingly, the present invention is applicable to upstanding electrical equipment, such as circuit-breaker equipment, for example, disposed in areas wherein seismic vibrations may be encountered.

SUMMARY OF THE INVENTION

According to the present invention, an energy-absorbing device, such as a liquid-filled vibration damper assembly, is provided preventing excessive relative motion between the lower supporting plate of the upstanding column, supporting electrical equipment, and the adjacent lower-disposed main supporting framework structure. Without damping, excessive motion of the column relative to the main frame could occur when the frequency of the ground motion is such as to cause amplification of the column motion.

According to one embodiment of the invention, a plurality of radially-outwardly-extending support arms are provided, fixedly rigidly secured to the lower supporting plate of an upstanding circuit-breaker column structure, which may, for example, support a two-break interrupting head structure at the upper end of the upstanding column structure, say, for example, 30 feet above the ground level.

At the outer end of each of the outwardly-extending supporting arms is disposed a seismic energy-absorbing damping device, such as a liquid-filled dash-pot assembly, for example, including a dash-pot-piston, which slidably moves within a hydraulic liquid-filled operating cylinder. The utilization of one or more of the radially-outwardly-extending support-arms, together with the dash-pot assembly, interposed between the outer ends of said supporting arms and the lower-disposed main structural supporting framework of the device, prevents excessive seismic swaying motion of the upstanding column structure, which generally tends to act as a stiff unitary assembly, because of the very high tensile loaded tie-rods disposed within the column structure, which tend to hold the several component parts of the upstanding column structure stiffly rigidly together.

DESCRIPTION OF THE PREFERRED EMBODIMENT

Figure 1:
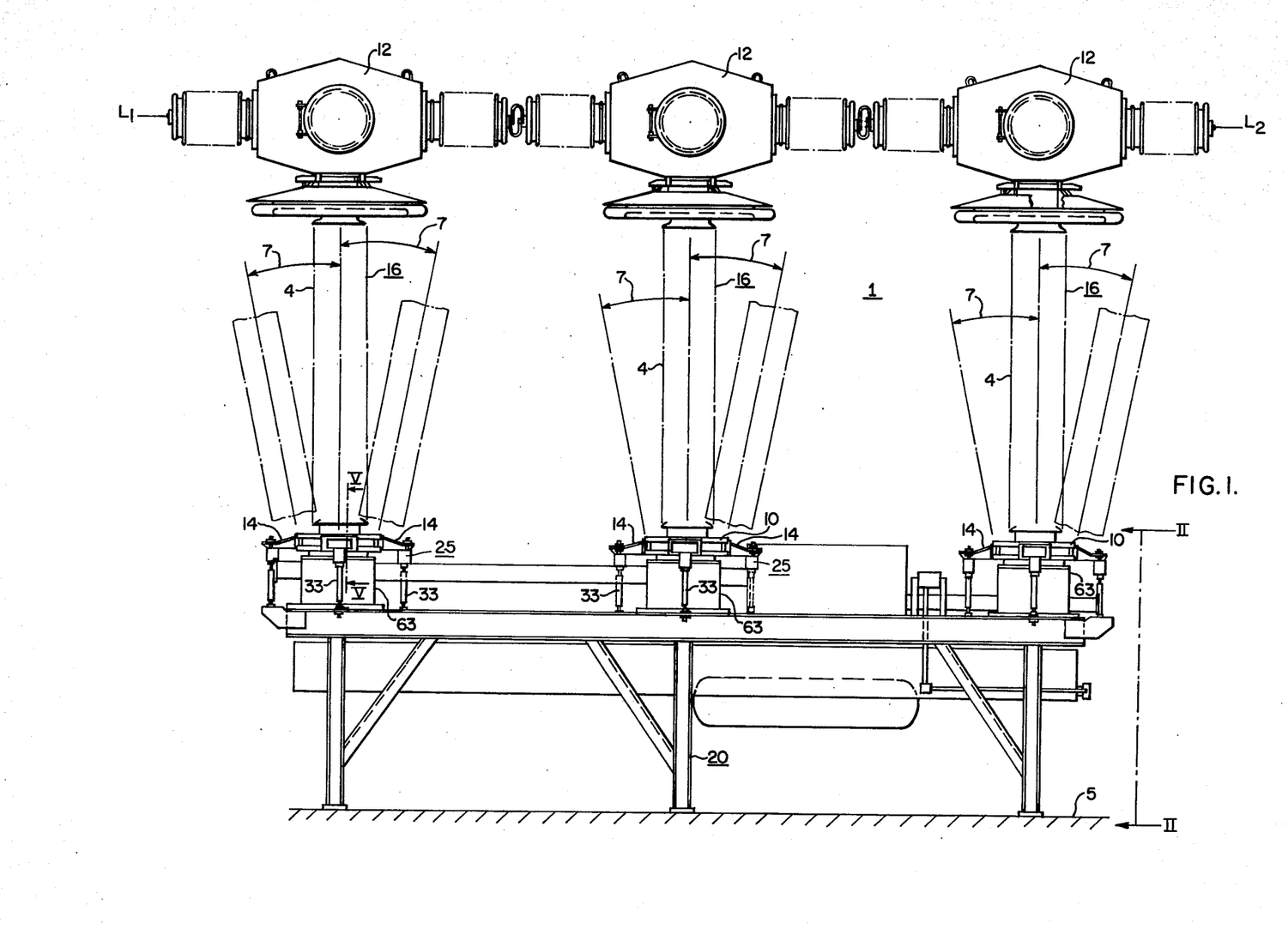
FIG. 1 is a side-elevational view of one circuit-breaker pole-unit utilizing three upstanding column assemblages electrically connected in electrical series, and controlling one phase of a three-phase circuit-interrupter assemblage, the view illustrating one embodiment of the present invention.

The San Fernando earthquake of Feb. 9, 1971 showed that live-tank extra-high-voltage circuit-breakers 1 are susceptible to damage in an adverse seismic environment. In particular, the low natural frequency (approximately 2.2 Hz) and low damping (approximately 1% of critical) of the porcelain column interrupter system 4 means that quasi-resonance swaying motion buildup can occur. Assuming that the concrete foundation 5 and underlying soil preparation are adequate, FIG. 1 shows how both the translation and rotation 7 of the bottom-plate support 10 for the upstanding porcelain column 4 can contribute to the large amplitude motion at the interrupter 12. This is estimated at ±4 inches for a 0.5g earthquake.

The porcelain column 4 design can be made stronger by increasing its diameter and applying larger compressive loads by means of axial tie-rods. This solution is considered practical, but requires new designs and expensive back-fitting. The concentrated bending load at the base of the porcelain column 4 can be reduced by adding sway-braces, that is, porcelain guys in tension, between the interrupter column-attachment and the support platform. This solution is not considered practical because platform outriggers would be required and the guys would have to be cleaned to minimize corona discharge caused by salt spray, etc.

According to the present invention, there is provided, preferably, a plurality of radially-outwardly-extending support arms, or outrigger arms 14, extending outwardly from the base-supporting plate structure 10 of each of the upstanding circuit-breaker column structures 16.

Each upstanding column structure 16 supports an interrupting head 12 at the upper end thereof, interiorly of which is a rotating movable contact structure (not shown) providing a pair of serially-related interrupting breaks to interrupt the electrical circuit. Reference may be had to U.S. Pat. No. 3,291,947, issued June 12, 1964, to Roswell C. Vansickle in this regard for a detailed description of the method of circuit interruption within the enclosed head structure 12. However, such a description constitutes no part of the present invention, which is more particularly concerned with seismic energy-absorbing damping devices utilized between the lower supporting base plate structure 10 of each column structure 16 and the lower-disposed main supporting framework structure 20 of the circuit-breaker assemblage 1.

Extra-high-voltage circuit-breakers 1 generally have at least one, and as many as three interrupting heads 12 per phase mounted on top of the upstanding porcelain columns 4. The column lengths 4 may be 150 to 200 inches, and the interrupter weight may be 3,500 to 5,000 lbs. Some circuit-breaker designs have separate guys to help stiffen the structure. It has been found that modifications to these upstanding columns 4 are necessary for the columns 4 to remain intact during seismic disturbances. It was determined that the upstanding column 4 should be stiffer, and that increased damping was necessary to prevent excessive seismic movement. This invention describes a method of providing the necessary damping, or energy absorption, at the upstanding column base 10, which may be applied to existing upstanding columns 4, and upstanding columns of future circuit-breakers which require seismic protection.

Figure 5:
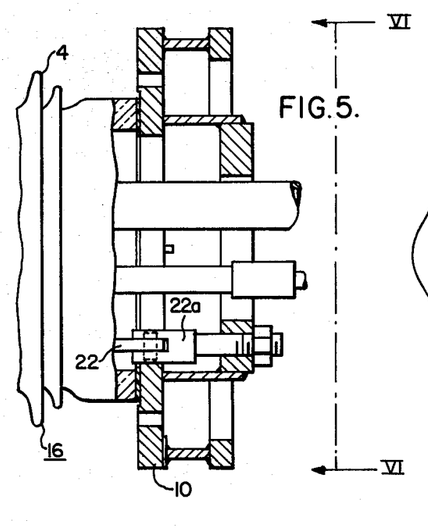
FIG. 5 is a fragmentary sectional view taken through the lower support-plate of the upstanding column assemblage taken along the line V—V of FIG. 1 looking in the direction of the arrows.
Figure 6:
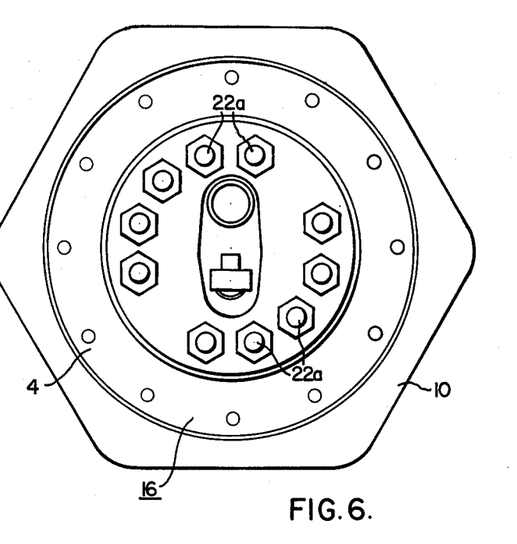
FIG. 6 is a view taken substantially along the line VI—VI of FIG. 5 looking in the direction of the arrows.

The upstanding column 4 is held together and made rigid by a number of highly-loaded tension rods 22 (FIG. 5) within the hollow column 4 having rod ends 22a as shown. Reference may be had to U.S. patent application Ser. No. 425,757, filed Dec. 18, 1973, by George B. Cushing et al., in this connection. When the interrupting head 12, mounted at the top of the column 4, is caused to move, the column 4 remains fairly straight, and flexing of structural parts within the frame occurs. There is relative motion between the main lower frame members 20 and the support plate 10 at the bottom end of the upstanding porcelain column 4. This relative motion is small, but calculations indicated that either an elastomer-type damper, or a fluid-filled energy-absorbing damper 25 could be designed to do the necessary damping to the column 4. The fluid-type damper 25 was chosen because of its lower cost, dependability over the circuit-breaker life, and its minimal deviation of damping characteristics over a wide ambient temperature range.

Figure 2:
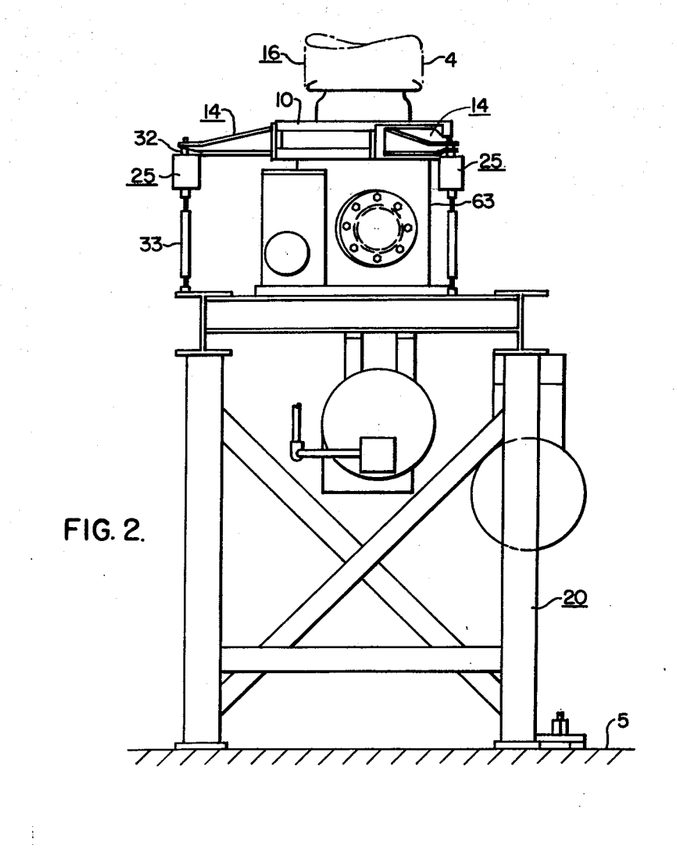
FIG. 2 is a fragmentary end-elevational view of the pole-unit of FIG. 1, taken substantially along the line II—II of FIG. 1.
Figure 3:
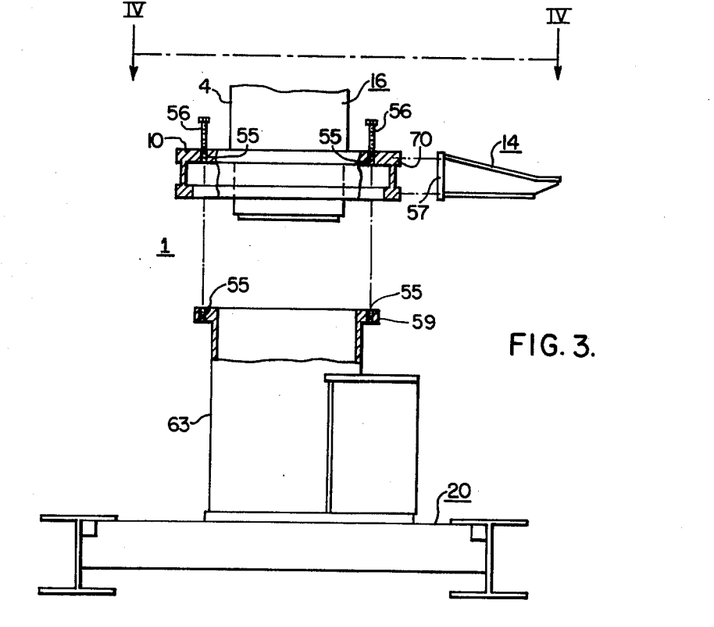
FIG. 3 is a fragmentary, enlarged side-elevational view of one of the upstanding column assemblages indicating the manner of attachment of the outrigger support arms to the lower main flange-support plate of the column assemblage.
Figure 4:
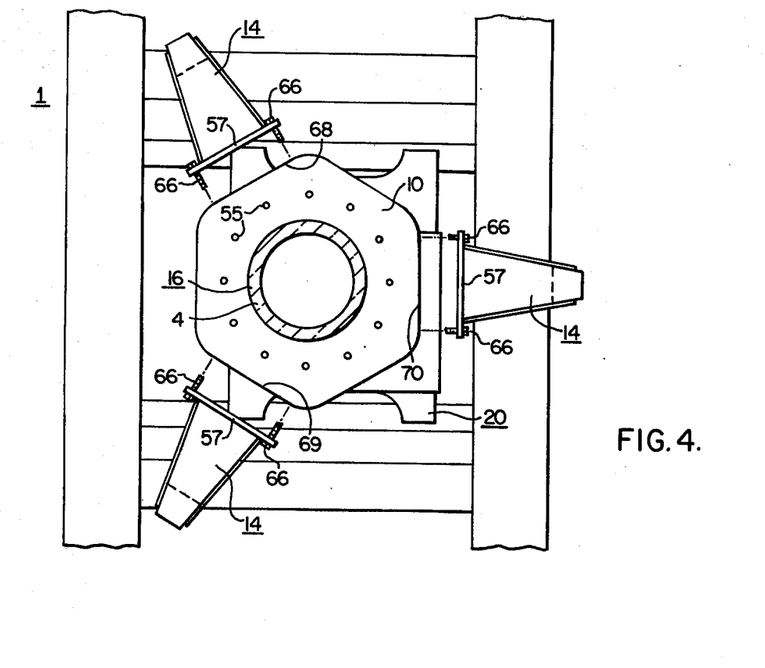
FIG. 4 is a fragmentary plan view, partially in section, taken substantially along the line IV—IV of FIG. 3 looking in the direction of the arrows.

This invention describes the novel application of an energy-absorbing device, or liquid-filled damper assemblies 25 to upstanding circuit-breaker columns 4 for protection against damage which may be caused by seismic disturbances. An example of the application of this invention is shown in FIGS. 2–4 of the drawings. Member 10 is the bottom support plate of the compressed upstanding hollow porcelain column 4. It has three equally-spaced, radially-extending support arms 14. Device 25 is the liquid-filled damper assembly; one upper end being attached to the above-mentioned radially-extending support arm 14, and the other lower end being attached to the lower main frame 20 of the circuit-breaker 1. Relative motion between the support arms 14 and the lower frame 20 causes the piston 27 (FIG. 11) to move within the damper 25, and damping is effected by displacement of hydraulic liquid 29 from one side of the motion-damping piston 27 to the other side through small orifices 30.

Figure 7:
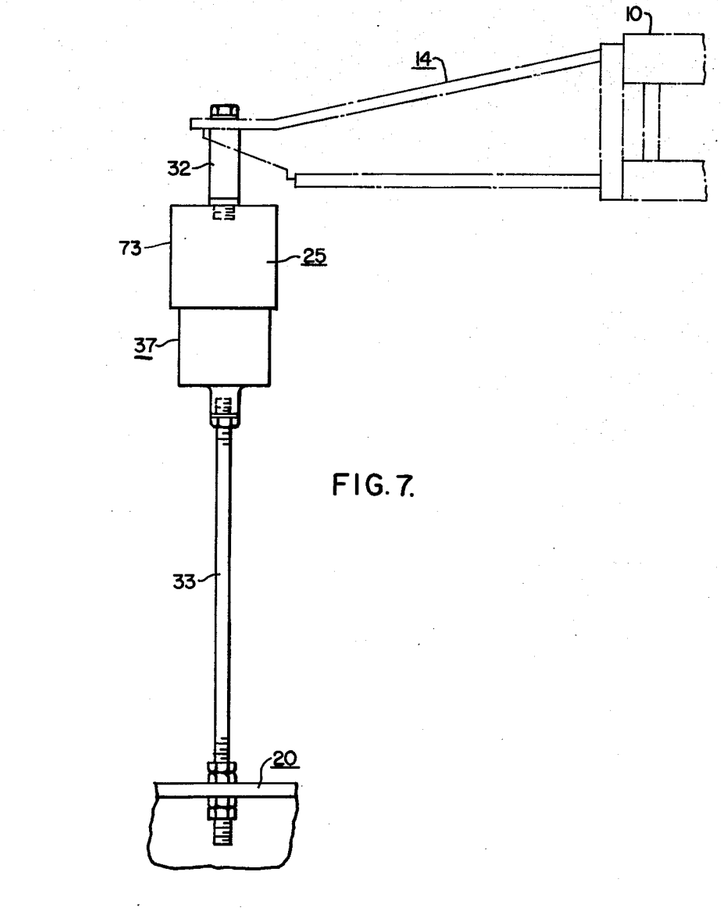
FIG. 7 is a considerably-enlarged view showing one of the hydraulic liquid-filled dash-pot assemblies interposed between one of the radially-outwardly-extending support arms and the connecting-rod mechanically connecting to the lower-disposed main supporting framework structure of the curcuit-breaker assemblage.
Figure 8:
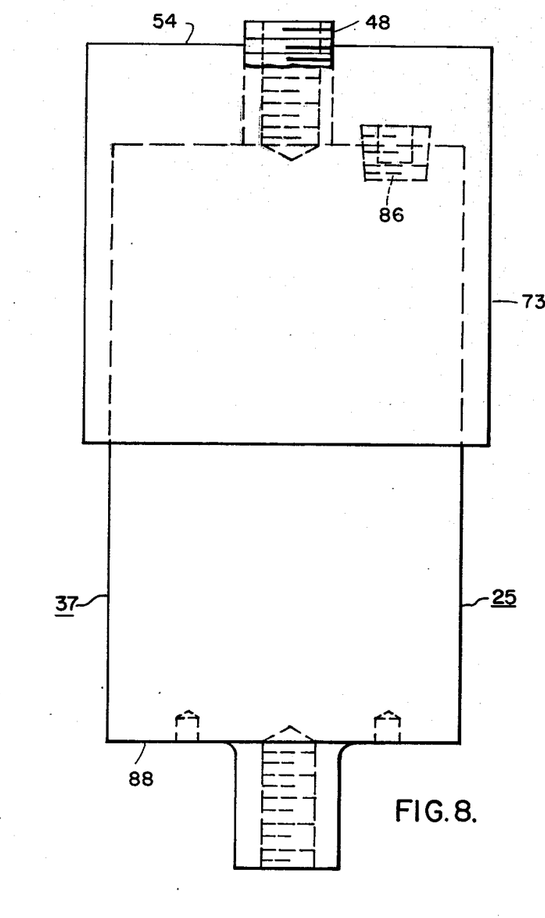
FIG. 8 is a side-elevational view of the hydraulic liquid-filled damper assembly utilized in the invention.
Figure 9:
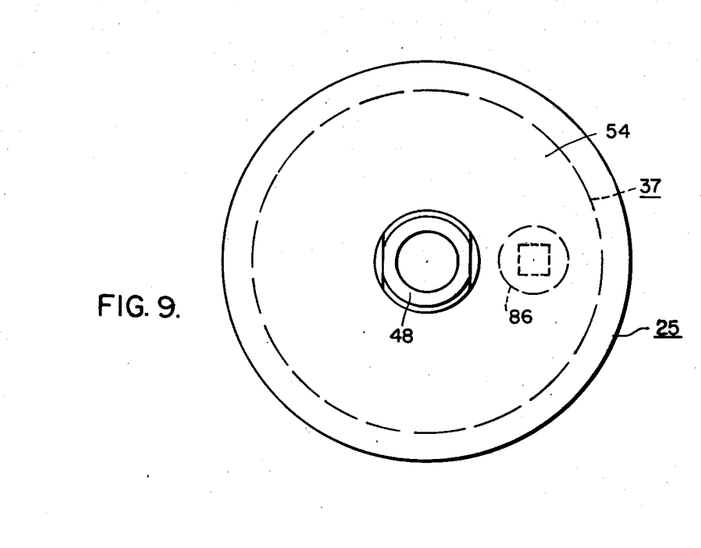
FIG. 9 is a top plan view of the hydraulic damper assembly of FIG. 8.
Figure 10:
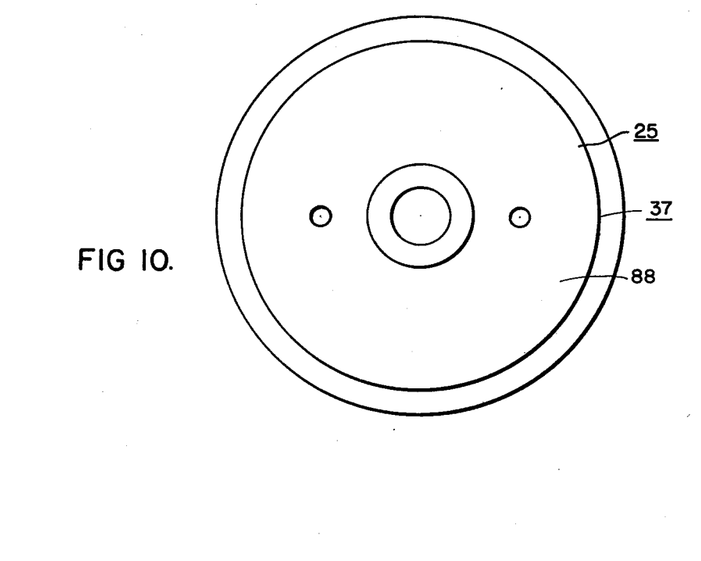
FIG. 10 is an inverted bottom plan view of the damper assembly of FIG. 8.

The purpose of the dash-pot 25, of course, is to dissipate energy. The dash-pots 25 are firmly connected to the base plate 10 of the upstanding porcelain column 4 and the lower main frame 20 by means of the connecting rods 32, 33 shown in FIG. 7 of the drawings. When ground motion occurs during an earthquake, the lower main frame 20, which is very stiff, tends to move with the ground 5, and the upper interrupter head 12, mounted on top of the upstanding porcelain column 4, tends to move at its natural frequency of about 2 hz. The upstanding porcelain column 4 is very stiff being under a high compressive load, as caused by the tension rods 22, and therefore not much bending of the upstanding column 4 occurs.

At the base of the upstanding column 10, where it is attached to the support plate 10, some movement or flexing of the structural parts occurs. This movement is relative to the lower main support frame 20. The relative motion can be on the order of ±¼ inch. At this point of relative motion are mounted three equally-spaced dampers (dash-pots) 25, which are designed to utilize the relative motion to damp the column motion 7, and to prevent amplification of this column motion 7, which could otherwise cause the upstanding column porcelains 16 to crack, or to rupture and then circuit-breaker 1 failure.

Figure 11:
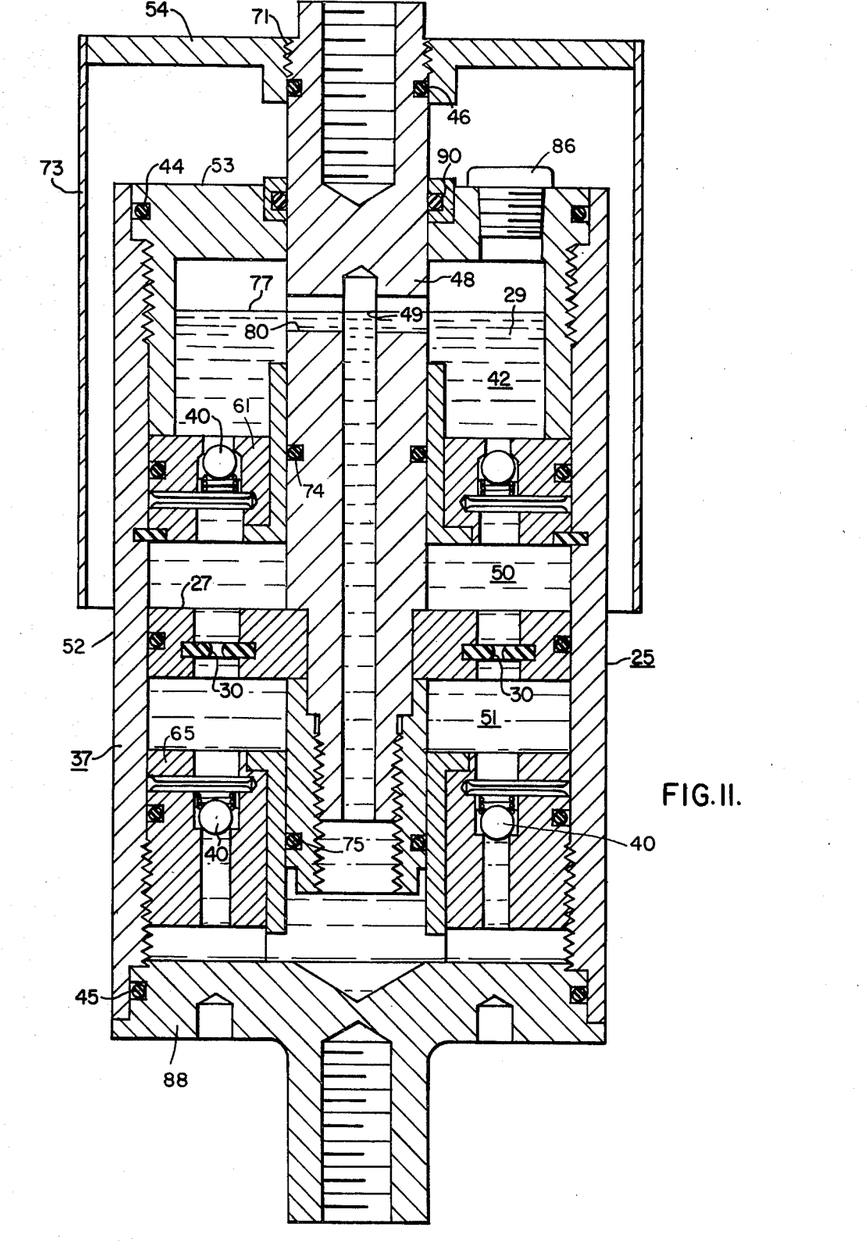
FIG. 11 is an enlarged vertical-sectional view taken through the liquid-filled hydraulic damper assembly of FIGS. 8–10, illustrating the hydraulic piston assembly in its neutral central position.

The damper (dash-pot) assembly 25 consists mainly of a piston 27, operating cylinder assembly 37, orifices 30 provided in piston member 27, check-valves 40, hydraulic fluid 29, upper fluid reservoir 42, and sealing means 44–46 74, 75 and 90. The function of the one-way acting check-valves 40 provided in two separated members 61, 65 is to assure that the spaces 50, 51 above and below the movable piston member 27 are completely filled with hydraulic fluid 29. The movable piston 27, as shown in FIG. 11, is shown in a neutral position within the chambers 50, 51, and this is the position it would be in when initially installed. Relative motion of a metallic column base 63 (FIG. 3) and the lower main frame 20 causes the piston 27 to move away from this neutral position. As the upper breaker head 12 is caused to move back and forth like a pendulum as indicated by the motion arrows 7, the piston 27 is caused to move up and down within chambers 50, 51.

Figure 19:
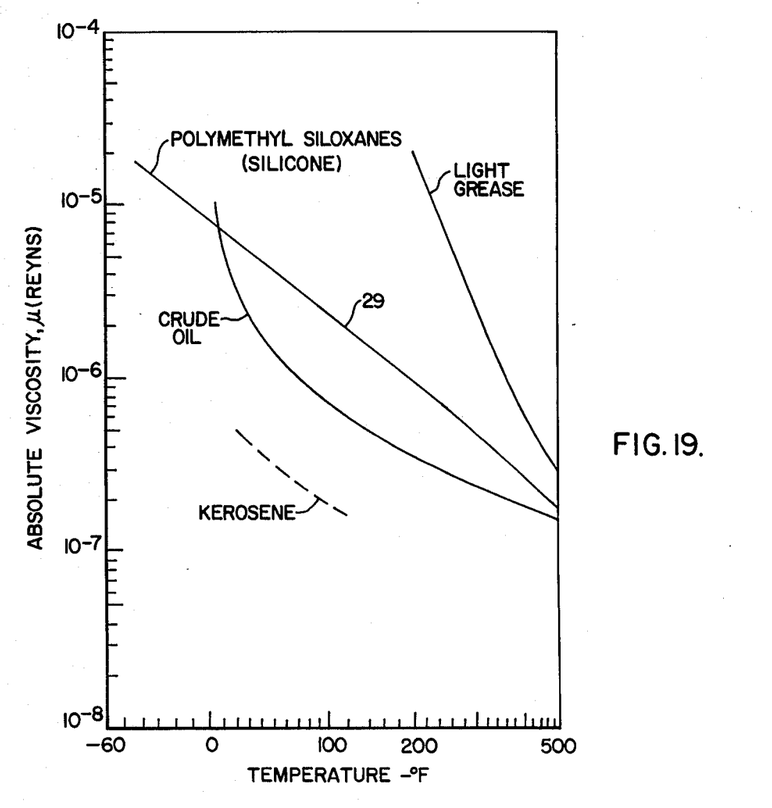

The piston velocity 27 is sinusoidal and therefore at maximum velocity at the neutral position of the piston 27 and column head 12. When the piston 27 movement occurs, the fluid 29 must flow from one side 50 of the piston 27 to the other side 51 through the small orifices 30, thus dissipating energy. The energy dissipation rate is a function of motion amplitude and orifice size 30. These orifices 30 have been sized so that they will not put excessive stresses on the upstanding hollow porcelain column 4, and at the same time they provide sufficient energy dissipation (damping) to prevent amplification of the column motion 7 to a point where column failure occurs. Fluid viscosity also affects the damping rate somewhat, so we have chosen to utilize the relatively flat viscosity vs. temperature characteristics of a silicone fluid, as shown in FIG. 19. This is not to say that other types of damper fluids could not be used in this application.

Note that the piston operating rod 48 is hollow, as at 49, so as to provide fluid communication to the reservoir 42, first to make up for piston rod 48 displacement, and secondly to make up for fluid 29 which may get past the rod seals 74, 75 during the compression stroke of the damper piston 27.

A cover plate 54 is also provided, as shown in FIG. 11, whose function is to keep the operating piston rod 48 relatively free from dirt and moisture contamination.

Figure 12:
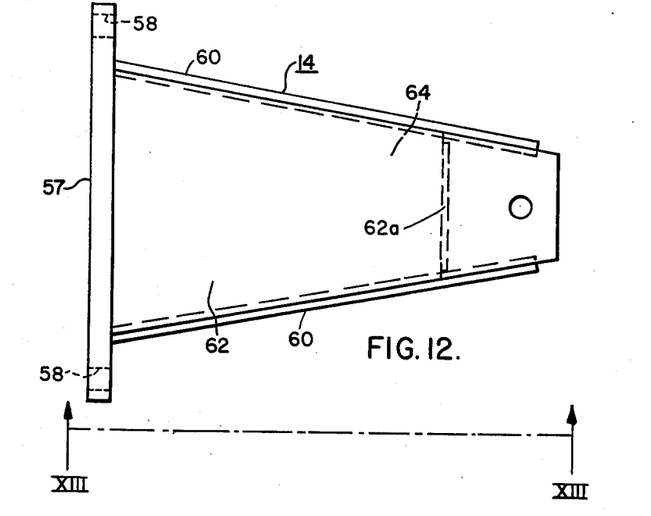
FIG. 12 is a top plan view of one of the outrigger-support arms capable of bolted attachment to one of the six sides of the lower flange-support plate of the upstanding column assemblage.
Figure 13:
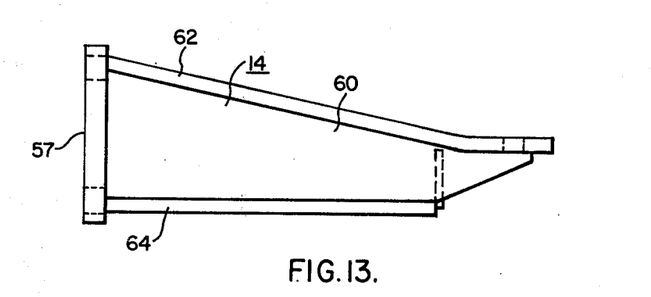
FIG. 13 is a side-elevational view of the out-rigger assemblage of FIG. 12, taken along the line XIII—XIII of FIG. 12 looking in the direction of the arrows.
Figure 14:
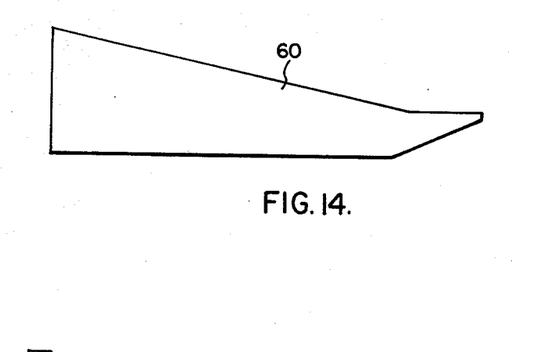
FIG. 14 is a detailed plan view of one of the side-suppport plates of the outrigger assemblage.
Figure 15:
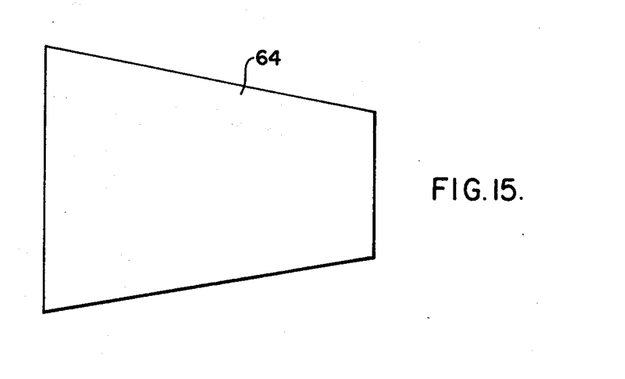
FIG. 15 illlustrates the lower plate of the generally box-shaped outrigger support assemblage of FIGS. 12 and 13.
Figure 16:
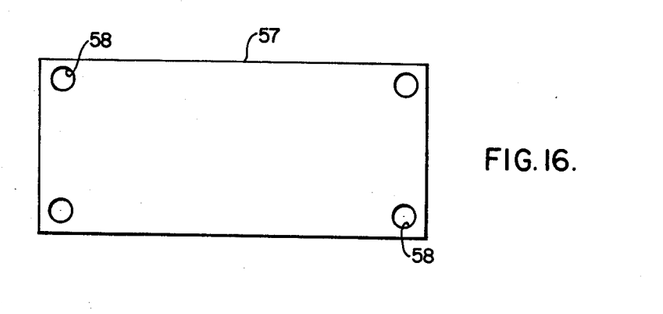
FIG. 16 is a detailed view of the vertically-extending support-plate of the outrigger assemblage.
Figure 17:
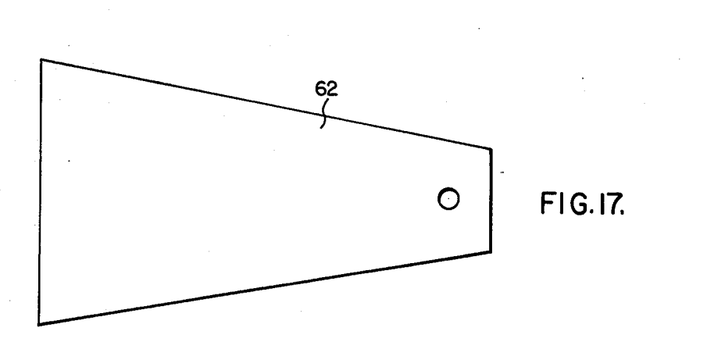
FIG. 17 is a top plan view of the top plate of the box-shaped outrigger assemblage.
Figure 18:
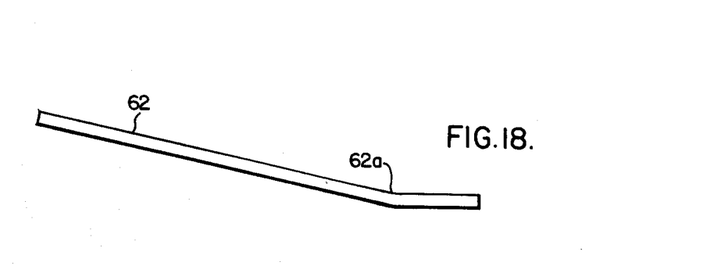
FIG. 18 is a side-elevational view of the upper support-plate of FIG. 17 indicating its bent condition; and, FIG. 19 is a graph of absolute viscosity vs. temperature for polymethyl siloxanes-(silicones).

The outrigger supporting arms 14 are generally of box-shaped construction, involving, as shown more clearly in FIGS. 12 and 13, a vertically-extending support-plate 57 (FIG. 16) having four support holes 58 provided therein, for example. Affixed, as by welding, for example, to said vertically-extending generally rectangularly-shaped support-plate 57 is a pair of outwardly-extending side-plate portions 60, each of which has a configuration more clearly set forth in FIG. 14. Additionally, there is provided an upper outwardly-extending support-plate 62, which is bent, as at 62a, thereby causing it to form a configuration, as more clearly shown in FIG. 18. In addition to the top support-plate 62 there is also provided a lower support-plate 64, the configuration of which is more clearly set forth in FIG. 15. FIGS. 12 and 13, as mentioned, show the generally box-shaped construction enabling the support-arm assembly 14, considered as a whole, to be bolted by four support bolts 66 (FIG. 4) to the outer sides 68, 69 and 70 of the heavy metallic lower support-plate 10, upon which the upstanding porcelain insulating column assembly 4 rests, as more clearly illustrated in the fragmentary detailed view of FIG. 4. Taken in conjunction with FIG. 3, a plan view, as illustrated in FIG. 4, more clearly shows the hexagonal shape of the heavy lower support-plate 10.

FIGS. 3 and 4 more clearly show that during the assembly the upper porcelain column assemblage 4, together with the lower support-plate assembly 10, is fixedly bolted by a plurality of circumferentially-disposed mounting bolts threaded into mounting holes 55 provided in an upper flange surface 59 of the column base 63 and the lower support plate 10. Preferably, there are provided three damper support-arm assemblies 14, as indicated in FIG. 4, these assemblies 14 also showing with additional clarity in FIG. 2.

With reference to FIG. 11, it will be observed that the upper piston-rod assembly 48 includes the cover plate 54 threadedly secured thereto, as at 71, having a lower-disposed downwardly-extending skirt portion 73. The piston-rod assembly 48 is fixedly secured to the movable centrally-positioned piston-assembly 27 having a pair of orifice openings 30 provided therein, to permit fluid 29, such as hydraulic oil, for example, being moved from the upper oil chamber 50 to the lower oil chamber 51 in response to any relative motion between the lower operating-cylinder assembly 37 and the upper piston-rod assembly 48. As mentioned hereinbefore, the upper piston-rod assembly 48 is fixedly secured to the upper outrigger arms, or support-arm assemblies 14, whereas the lower-disposed operating-cylinder assembly 37 is threadedly connected, through a lower tie-rod 33 (FIG. 7) to the lower main frame-support 20 for the circuit-interrupter 1.

Preferably, hydraulic liquid 29 fills the chambers 42, 50 and 51 to the level indicated by the reference numeral 77. Also, it will be noted that a downward thrusting action exerted upon the piston-rod assembly 48 and the piston 27 fixedly secured thereto, will compress oil 29 within the lowermost oil region 51 and force it upwardly through the hollow interior 49 of the piston-rod 48 itself, and out through the lateral ports 80 into the upper oil chamber 42. In a similar manner, to prevent any vacuum, or cavitation being drawn on either side of the piston 27, namely, in either of these two oil chambers 50 and 51, the one-way-acting valves 40 are provided to draw oil 29 into the oil chamber 50 or 51, which is increasing in its volume, and to permit an exhausting of oil 29 in the oil chamber 50 or 51 having its volume decreased, through the piston 27 having the orifice openings 30 provided therein. Thus, energy is absorbed by any relative motion between the operating cylinder assembly 37 and the piston-rod assembly 48 due to the oil, which is forced through the orifice openings 30 provided in the piston 27.

A filling plug 86 is provided at the upper end of the operating-cylinder assembly 37, through which oil 29 may be filled, or replenished, as mentioned, to the level 77. Additionally, an upper cover plate 53 and a lower cover plate 88 may be threadedly secured into position within an operating cylilnder 52 with O sealing rings provided therein, as indicated by the reference numerals 44 and 45, to prevent oil leakage out of the damper assembly 25. Also, a seal is preferably provided about the relatively movable piston-rod 48 itself, as indicated by the reference numeral 90 in FIG. 11.

The purpose of the damper assembly, or energy-absorbing device 25, is to absorb energy due to any relative motion between the piston-rod assembly 48 and the lower-disposed operating-cylinder assembly 37. This energy is absorbed, as will be obvious, by the oil velocity passing through the orifice openings 30 provided in piston member 27.

It will be observed that the damper assembly 25 preferably contains a hydraulic fluid 29, which does not change its characteristics in response to ambient temperature changes. In more detail, the damper assembly 25 contains a liquid-fluid 29, which, preferably, is relatively insensitive to wide ambient temperature variations. We prefer to utilize liquids known under the trade name "Silicone", which are polymethyl siloxanes, and are supplied by a number of companies, for example: Dow Corning Corporation at Midland, Michigan 48640, and the General Electric Company at its division located at Pittsfield, Massachusetts.

As shown in the attached graph of FIG. 19, such polymethyl siloxanes (silicone) are relatively insensitive to wide temperature variations, this graph showing the viscosity-temperature curve for the fluid 29. It will be noted that the ordinates are on a logarithmic scale so that they actually indicate tremendous changes in viscosity, and the abscissa illustrate the temperature in degrees Fahrenheit.

It should also be noted that it may be possible to apply this construction of energy-absorption, or damping to other upstanding structures, which have a relatively high center of gravity and stiff support members, with end attachments which will allow some relative motion to occur.

From the foregoing description, it will be apparent that there has been provided an improved energy-absorption means, or damping arrangement, for preventing seismic disturbances damaging electrical equipment structures, for example, of the upstanding type, such as upstanding circuit-breaker structures, for example, so as to minimize the possibility of breakage of the upstanding hollow porcelain columns 4, or other damage occurring to the electrical equipment during earthquake conditions.

What is claimed is:
1. A support system for upstanding electrical apparatus having a tall, slender profile that is capable of protecting the upstanding electrical apparatus against severe earthquake forces, comprising, in combination:
   a. means defining upstanding electrical equipment including at least one upstanding insulating column structure;
   b. means defining a lower-disposed main metallic supporting framework structure (20) in contact with the ground and responsive to the earthquake motion thereof;
   c. means defining a hollow metallic column base (63) in general vertical alignment with said upstanding insulating column structure for rigidly supporting said one upstanding insulating column structure with the former being fixedly secured to said lower-disposed main metallic supporting framework structure (20);
   d. means including a metallic base-supporting plate structure (10) fixedly secured to the lower end of said upstanding insulating column structure for fixedly securing said one upstanding insulating column structure to said hollow metallic column base (63) in vertical superimposed relationship;
   e. at least a pair of spaced metallic radially-outwardly-extending outrigger arms (14) fixedly secured to said metallic base-supporting plate structure (10); and,
   f. means defining a dashpot assembly (25) interposed between the outer end of each of said pair of metallic outrigger arms (14) and said lower-disposed main metallic supporting framework structure (20) for dissipating the kinetic energy of possible swaying movement of the upstanding insulating column structure in response to earthquake stimulation.

2. The combination according to claim 1, wherein the metallic base-supporting plate structure (10) has a multi vertical-faced configuration (68, 69, 70), the spaced metallic radially-outwardly-extending outrigger arms (14) each has a vertical plate-portion (57) constituting a component part thereof, and fastening means (66) secure each of said vertical plate portions (57) of the several outrigger arms (14) to a respective vertical face portion (68, 69, 70) provided by said metallic base-supporting plate structure (10) for fixed attachment thereto.

3. The combination according to claim 1, wherein each dashpot assembly (25) comprises a relatively-movable operating cylinder (37) at least partially filled with liquid and an apertured (30) piston-member (27) movable therewithin with damping action ensuing.

4. The combination according to claim 3, wherein a pair of spaced relatively-fixed plate members (61, 65) are provided being disposed on opposite sides of said apertured piston-member (27), and each of said relatively-fixed plate-members (61, 65) has a unidirection-al-acting valve means (40) provided therein.

5. The combination according to claim 1, wherein three spaced outrigger arms (14) are utilized being spaced equiangularly around the circumference of said upstanding insulating column structure (4).

* * * * *